2,890,985

COMPOSITION AND METHOD FOR RELIEVING SPASTICITY

David F. Marsh, Lafayette Hill, Pa., and Joseph Sam, Syracuse, N.Y.; Audrey S. Marsh, executrix of the estate of said David F. Marsh, deceased No Drawing. Original application August 8, 1955, Serial No. 527,145. Divided and this application October 28, 1955, Serial No. 543,579

9 Claims. (Cl. 167—65)

The present invention relates to a novel medical preparation for the relief of spasticity and to a method for relieving spasticity. The present application is a division of application Serial No. 527,145, filed August 8, 1955, and now abandoned.

Spasticity is an uncontrolled, involuntary, excessive contraction of one or more skeletal muscles and is a major component of many common disease conditions. It has been difficult if not impossible to relieve clinically. The manifestations of spasticity range in severity from those observed in minor transient injuries to localized areas, such as sprains and strains, through more serious conditions, such as chronic low back pain (lumbago), rheumatoid arthritis and rheumatoid spondylitis to the very severe incapacitating neurological diseases, such as multiple sclerosis, Parkinson's disease, cerebral palsy, and the like.

Mephenesin is known to relieve, in animals, experimentally induced spasticity, that is, to produce relaxation of the skeletal muscles, by a mechanism involving the depression of the polysynaptic pathways of the central nervous system. The activity of this compound is so low and the duration so brief, that it is not feasible to employ this material clinically for the relief of spasticity. In addition, as is known, the administration of this material produces undesirable side effects, such as initial excitement, salivation, nausea and vomiting. There are also certain other compounds, discussed in the literature, which are stated to possess this ability to relax skeletal muscles. These compounds include 2-amino-benzoxazole, 2-amino-5-chorobenzothiazole and 2-amino-6-methylbenzothiazole. However, these compounds also produce the undesirable effects mentioned above even at the dose levels insufficient to produce muscular relaxation. (L. S. Goodman and A. Gilman, pp. 206–208, The Pharmacological Basis of Therapeutics, second ed., 1955, the Macmillan Co., New York.)

It is the principal object of the present invention to provide novel compositions possessing valuable therapeutic properties, that is, the ability to produce relaxation of the skeletal muscles by a mechanism involving the depression of the polysynaptic pathways of the central nervous system and thus the ability to relieve spasticity in animals and man.

It is another object of the invention to provide novel medical preparations which possess the beneficial action on the central nervous system referred to above, without, however, deleterious side effects, such as initial excitement, salivation, nausea or vomiting.

Still another object of the present invention is to provide novel medical preparations capable of producing, at reasonable doses, useful relaxation of skeletal muscles for substantial periods of time and which possess a wide margin between the effective dose and the lethal dose.

A further object is to provide a novel method for relieving spasticity in animals and man.

Other objects, including the provision of means for preparing the novel compositions, will become apparent from a consideration of the following specification and claims.

The composition of the present invention comprises a benzoxazole compound selected from the group consisting of 2-amino-5-chlorobenzoxazole and salts thereof, and a pharmaceutical carrier.

The compositions of the present invention have been found to produce relaxation of the skeletal muscles by a mechanism involving the depression of the polysynaptic pathways of the central nervous system. That is to say, the compositions prevent or overcome hypertonia and hyperflexia by selective depression of subcortical and spin polysynaptic pathways. Compared to mephenesin, the present compositions are at least four times as active in producing relaxation when given orally, have an exceptionally long duration of action (up to 24 hours in therapeutic doses), have a wide safety margin between effective dose and lethal dose, and lack any significant side effects, including initial excitement, salivation, nausea or vomiting. The compositions may therefore be readily employed for the relief of spasticity in animals and man. Of special importance is the fact that the compositions are highly effective orally, and the preferred compositions are, therefore, adapted for oral administration such as in the form of suspension, capsule or tablet dosage form. As will appear hereinafter, numerous tests have been made using compositions of the invention in various species of animals and in man from which it is evident that the compositions are highly effective in the relaxation of the skeletal muscles and are safe.

The 2-amino-5-chlorobenzoxazole may be prepared by the removal of hydrogen sulfide from 5-chloro-2-hydroxyphenylthiourea in accordance with the procedure disclosed and claimed in copending application Serial No. 527,883, filed August 11, 1955, and now Patent No. 2,780,633, issued February 7, 1957. A specific example of the preparation of the compound in accordance with that procedure is as follows:

Example A

Sixty-one grams of 5-chloro-2-hydroxyphenylthiourea are mixed with 145 grams (0.65 mole) of yellow lead oxide and one liter of methanol. The mixture is refluxed with stirring for three hours. The lead sulfide which is formed and the excess lead oxide are removed by filtration and washed with methanol. The methanol solutions are combined, and distillation of the methanol under vacuum, leaves, as residue, crude 2-amino-5-chlorobenzoxazole. Recrystallization several times from benzene results in white crystals melting at 185–185.5° C.

The calculated analysis for $C_7H_5ClN_2O$ is C, 49.9; H, 3.0; Cl, 21.0; and N, 16.6; that found is C, 49.5; H, 3.2; Cl, 20.9 and N, 16.5.

An ultraviolet spectrum of a solution of 2 milligrams of the compound per 100 milliliters of methanol shows peaks at 244 and 285 mu.

A specific example of the preparation of 5-chloro-2-hydroxyphenylthiourea is as follows:

Example B

To a solution of 106 grams (0.74 mole) of 2-amino-4-chlorophenol in 500 milliliters of water containing 69 ml. of concentrated hydrochloric acid (29.2 grams, 0.8 mole) are added 60.8 grams (0.8 mole) of ammonium thiocyanate. The solution is placed in an evaporating dish and heated on a steam bath for 5 hours. The solid which results is then removed from the concentrated solution by filtration, washed with a small amount of water and dried. The filtrate is placed in an evaporating dish and heated on a water bath for two hours. At the end of this time, the mixture is cooled, and the solid which precipitates out is removed by filtration. Both solid products are 5-chloro-2-hydroxyphenylthiourea and may be combined.

The 2-amino-5-chlorobenzoxazole may also be prepared by aminating the carbon atom in the number 2 position of 5-chlorobenzoxazole in accordance with the procedure disclosed and claimed in copending application Serial No. 527,884, filed August 11, 1955, and now abandoned. A specific example of the preparation of the compound by this procedure is as follows:

*Example C*

A slurry of 2 grams of 2,5-dichlorobenzoxazole in 20 ml. of 28% aqueous ammonia is shaken vigorously for about an hour until all the dichloro compound has reacted. The solid 2-amino-5-chlorobenzoxazole is then filtered off and washed with water. To hasten the reaction, the mixture may be heated gently under a reflux condenser during the stirring period, the heating not being sufficient to drive off substantial amounts of ammonia before the reaction is completed. Crystallization of the solid product from benzene gives 2-amino-5-chlorobenzoxazole melting at 185–186° C. Ultraviolet spectrum analysis in methanol shows peaks at 245 and 286 mu.

The 2-amino-5-chlorobenzoxazole possesses basic properties enabling it to form addition salts with acids. Hence this compound may be employed either as the base or as a salt. The acid forming the salt may be any inorganic or organic acid producing a pharmaceutically acceptable salt, for example, hydrochloric, hydrobromic, hydriodic, nitric, sulfuric, phosphoric, and the like; acetic, propionic, caproic, stearic, and other acids of this series, and the like; crotonic, fumaric, oleic, citric, tartaric, lactic, benzoic, naphthoic, salicylic, methane sulphonic, camphor sulphonic, and the like.

If a salt is employed, the salt will be pharmaceutically acceptable and any toxicity or other undesirable effects which may be imparted should be taken into consideration as well known in the art. Pharmaceutically useful salts should not be substantially more toxic than the compound itself and should be able to be incorporated in liquid or solid pharmaceutical media for the preparation of therapeutically useful compositions.

In preparing the compositions of the present invention the benzoxazole compound will be combined with a significant amount of a pharmaceutical carrier. The carrier may take a wide variety of forms depending upon the form of the preparation desired for administration. For parenteral injection the carrier may be sterile water with suitable adjustment of the pH to insure solution of the benzoxazole compound. For example, the compound not in salt form is practically insoluble in water while the salts vary in solubility, and in some cases the solubility of a salt is not sufficient to provide the desired concentration. In this case the pH may be further adjusted. Thus when using the hydrochloride, for instance, in water, the pH will be further adjusted by the addition of acid to maintain the compound in solution. As stated, the preferred form of administration of the present composition is oral, and the oral dosage may be in the form of a suspension, powder adapted for suspension in liquid media, tablet or capsule. In preparing the compositions in oral dosage form any of the usual pharmaceutical carrier media may be employed, such as gelatin, in the case of capsules; sterile water, glycols, oils, alcohols, and the like in the case of suspensions; starches, sugars, kaolin, salts, lubricants, binders, and the like in the case of powders and tablets. Tablets represent the most advantageous oral dosage form.

The amount of the composition administered and the amount of benzoxazole compound in the composition may vary somewhat depending upon the severity of the spasticity and upon the species being treated. As far as administration is concerned, the amount of composition administered may range from that providing as little as about 2 milligrams of the benzoxazole compound per kilogram of body weight to that providing as high as about 100 milligrams per kilogram, preferably in the case of humans, that providing between about 5 and about 40 milligrams of benzoxazole compound per kilogram of body weight. In the composition, the concentration of the benzoxazole compound should be at least about 1%, by weight, preferably at least about 2%. The concentration of the benzoxazole compound may vary widely above these figures depending upon the form the composition takes, and in some cases the concentration of the benzoxazole compound may go as high as about 80–90%. Depending also upon the severity of the spasticity and upon the species being treated, as stated, the amount of benzoxazole compound per dosage unit form may also vary widely. Generally, the compositions per dosage unit will contain at least about 25 milligrams of the benzoxazole compound, and in some cases, such as in compositions for the treatment of large domestic animals, like horses, the amount per dosage unit may reach as high as about 10,000 milligrams. In the case of compositions adapted for human administration, the amount will generally range between about 100 and about 1000 milligrams of benzoxazole compound per dosage unit. Compositions of the present invention have been administered intraperitoneally, in the form of a 2% aqueous solution of the 2-amino-5-chlorobenzoxazole with sufficient hydrochloric acid to provide a pH of 1.3, to albino mice; intraperitoneally, in the form of a 2% suspension of the 2-amino-5-chlorobenzoxazole in a solution containing 8.6% polyethylene glycol 300, 0.5% sodium carboxymethyl cellulose and the remainder water, to albino mice, to albino rats and to hamsters; intravenously, in the form of the above-stated suspension to which sufficient hydrochloric acid is added to provide a pH of 1.8–2.1 thereby forming a solution of the 2-amino-5-chlorobenzoxazole, to albino rabbits; orally, in the form of the above-stated suspension and as capsules imbedded in raw liver, to dogs; as well as orally, intravenously and intraperitoneally to cats and intraperitoneally to guinea pigs, demonstrating and confirming the marked ability to relax skeletal muscles at levels not providing undesirable side effects.

In addition to the above, other investigations of 2-amino-5-chlorobenzoxazole are reported in Fed. Proc. 14, page 356, March 1955, by K. Kamijo and G. B. Koelle; in Fed. Proc. 14, page 341, March 1955, by W. H. Funderburk and R. T. Woodcock; and in Proc. Soc. Exper. Biol. and Med., 88, page 565, April 1955, by K. Kamijo and G. B. Koelle.

The following examples illustrate the preparation of typical compositions of the present invention in oral dosage unit form.

*Example I*

The following formula is for preparing 8000 tablets (10 grains) each containing 250 mg. of 2-amino-5-chlorobenzoxazole:

| | |
|---|---:|
| 2-amino-5-chlorobenzoxazole _____g__ | 2000 |
| Milk sugar _____g__ | 800 |
| Dibasic calcium phosphate U.S.P. _____g__ | 1527.2 |
| Starch (filler and distintegrating agent) ____g__ | 799.3 |
| Calcium stearate _____g__ | 56.7 |
| Gelatin solution _____pounds per gallon__ | 1.5 |

In place of the milk sugar, dibasic calcium phosphate and the portion of the starch making up the filler, there may be used sucrose, polyethylene glycol 4000, mannitol and/or calcium carbonate in various combinations and proportions. Starch paste, acacia solution, glucose solution, carboxymethylcellulose solution, shellac, or the like may be used in place of gelatin solution as granulating agent. Calcium stearate is employed as lubricating agent and may be replaced by magnesium stearate, stearic acid, talc or the like.

*Example II*

The following formula may be employed for preparing 10,000 tablets (11.25 grains) each containing 500 mg. of 2-amino-5-chlorobenzoxazole:

| | |
|---|---|
| 2-amino-5-chlorobenzoxazole | 11 lbs., 162 gr. |
| Milk sugar | 1 lb., 13 oz., 96 gr. |
| Starch (filler) | 1 lb., 13 oz., 96 gr. |
| Polyethylene glycol 4000 | 7 oz., 24 gr. |
| Starch (disintegrating agent) | 13 oz., 340 gr. |
| Calcium stearate | 1 oz., 180 gr. |
| Gelatin solution | 1.5 pounds per gallon. |

*Example III*

The following formula may be employed to make 1000 #3 capsules each containing 100 mg. of 2-amino-5-chlorobenzoxazole:

| | | |
|---|---|---|
| 2-amino-5-chlorobenzoxazole | g | 100 |
| Milk sugar | g | 150 |
| Fill weight | mg | 250 |

In place of or in addition to the milk sugar may be used sucrose, dicalcium phosphate, calcium carbonate, kaolin, mannitol and/or starch, and the like.

*Example IV*

The following formula may be employed for preparing a suspension containing 250 mg. of 2-amino-5-chlorobenzoxazole per 5 cc.:

| | | |
|---|---|---|
| 2-amino-5-chlorobenzoxazole (200 mesh) | g | 51.5 |
| Propylene glycol | g | 50 |
| 70% sorbitol solution | g | 250 |
| Alcohol (7.7%) | cc | 77 |
| Carboxymethyl cellulose (low viscosity, type 70) | g | 10 |
| Granulated sugar | g | 375 |
| Methyl ester of parahydroxybenzoic acid | g | 1.5 |
| Propyl ester of parahydroxybenzoic acid | g | 0.3 |
| Polyoxyethylene sorbitan monooleate | cc | 0.5 |
| Flavoring | cc | 3 |
| Citric acid | g | 1.5 |
| Water, q.s.a.d. 1000 cc. | | |

In place of the propylene glycol may be used polyethylene glycol and/or glycerine. The carboxymethyl cellulose may be replaced by any one of the natural gums used as suspending agents. The parahydroxybenzoic acid esters may be replaced by any commonly used bacteriostatic agent, and other commonly used surface agents may be used in place of the polyoxyethylene sorbitan monooleate.

*Example V*

The following formula illustrates the preparation of a suspension containing 500 mg. per 5 cc. of 2-amino-5-chlorobenzoxazole:

| | | |
|---|---|---|
| 2-amino-5-chlorobenzoxazole | g | 103 |
| Carboxymethyl cellulose (low viscosity, type 70) | g | 20 |
| 70% sorbitol solution | g | 250 |
| Granulated sugar | g | 375 |
| Propylene glycol | g | 50 |
| Methyl ester of parahydroxybenzoic acid | g | 1.5 |
| Propyl ester of parahydroxybenzoic acid | g | 0.3 |
| Polyoxyethylene sorbitan monooleate | g | 0.5 |
| Methyl salicylate | cc | 2.5 |
| Water, q.s.a.d. 1000 cc. | | |

Compositions of the type illustrated in Examples I–V have been administered, by the present time, to well over 200 patients. The periods of administration have been as long as eight weeks, and doses as large as 6 grams of benzoxazole a day have been used. Most patients received 500 mg. or more three or four times a day. The administration of these compositions has been found to produce a significant degree of relief from muscle stiffness, spasm and pain in patients with the fibrositic type of arthritic involvement and in rheumatoid spondylitis. The compositions also produce prompt symptomatic relief of a moderate to a marked degree from low back pain and muscle spasm, and have been shown to produce some relief of spasticity in severe neurological disorders.

Modification is possible in the selection of carrier material and in the amount thereof in preparing compositions in accordance with the present invention without departing from the scope thereof.

We claim:

1. A pharmaceutical composition comprising at least about 1%, by weight, of a 2-amino-5-chlorobenzoxazole compound selected from the group consisting of 2-amino-5-chlorobenzoxazole and salts thereof, and a pharmaceutical carrier.

2. A pharmaceutical composition comprising at least about 1%, by weight, of a 2-amino-5-chlorobenzoxazole compound selected from the group consisting of 2-amino-5-chlorobenzoxazole and salts thereof, and a liquid pharmaceutical carrier.

3. The product of claim 2 wherein said 2-amino-5-chlorobenzoxazole compound is suspended in said liquid pharmaceutical carrier.

4. A pharmaceutical composition comprising at least about 1%, by weight, of a 2-amino-5-chlorobenzoxazole compound selected from the group consisting of 2-amino-5-chlorobenzoxazole and salts thereof, and a solid pharmaceutical carrier.

5. The product of claim 4 in tablet form.

6. A pharmaceutical composition in dosage unit form comprising, per dosage unit, at least about 25 milligrams of a 2-amino-5-chlorobenzoxazole compound selected from the group consisting of 2-amino-5-chlorobenzoxazole and salts thereof, and a pharmaceutical carrier.

7. The product of claim 6 containing between about 100 and about 1000 milligrams of 2-amino-5-chlorobenzoxazole compound per dosage unit.

8. A pharmaceutical composition comprising at least about 1%, by weight, of 2-amino-5-chlorobenzoxazole and a pharmaceutical carrier.

9. A pharmaceutical composition comprising at least about 1%, by weight, of a salt of 2-amino-5-chlorobenzoxazole and a pharmaceutical carrier.

References Cited in the file of this patent

UNITED STATES PATENTS 2,780,633    Sam    Feb. 5, 1957

OTHER REFERENCES

Domino et al.: "Pharmacol. Properties of Benzazoles," J. Pharmacol. and Expt. Therap., vol. 105, 1952, pp. 486 et seq.

Putnam et al.: Reprint from Arch. of Neurology and Psychiatry, March 1941, vol. 41, pp. 505–516.

Goodman et al.: The Pharmacol. Basis of Therap., p. 206, 2nd ed., N.Y., 1955. The Macmillan Co.

UNITED STATES PATENT OFFICE

CERTIFICATE OF CORRECTION

Patent No. 2,890,985                                             June 16, 1959

David F. Marsh et al.

It is hereby certified that error appears in the above numbered patent requiring correction and that the said Letters Patent should read as corrected below.

In the grant, lines 2 and 3, for "Audrey S. Marsh, executrix of the estate of said David F. Marsh, deceased," read -- assignors to McNeil Laboratories, Incorporated, of Philadelphia, Pa., a corporation of Pennsylvania, --; lines 12 and 13, for "Joseph Sam, his heirs or assigns, and Audrey S. Marsh, as executrix, her successors" read -- McNeil Laboratories, Incorporated, its successors --; in the heading to the printed specification lines 5 and 6, for "Audrey S. March, executrix of the estate of said David F. Marsh, deceased" read -- assignors to McNeil Laboratories, Incorporated, Philadelphia, Pa., a corporation of Pennsylvania --; column 2, line 13, for "spin" read -- spinal --.

Signed and sealed this 17th day of November 1959.

(SEAL)
Attest:

KARL H. AXLINE                                               ROBERT C. WATSON
Attesting Officer                                    Commissioner of Patents